United States Patent [19]

Forbes

[11] Patent Number: 4,504,450
[45] Date of Patent: Mar. 12, 1985

[54] SULFUR OXIDES AND NITROGEN OXIDES GAS TREATING PROCESS

[75] Inventor: James T. Forbes, Arlington Heights, Ill.

[73] Assignee: UOP Inc., Des Plaines, Ill.

[21] Appl. No.: 451,513

[22] Filed: Dec. 20, 1983

[51] Int. Cl.³ .................. B01J 8/00; C01B 21/00; C01B 17/00

[52] U.S. Cl. .................. 423/239; 423/244; 55/73; 55/74

[58] Field of Search .................. 55/73, 74, 77; 423/244 R, 244 A, 239, 239 A

[56] References Cited

U.S. PATENT DOCUMENTS

| | | | |
|---|---|---|---|
| 3,501,897 | 3/1970 | Van Helden et al. | 423/244 X |
| 3,989,798 | 11/1976 | Greene et al. | 423/244 |
| 4,122,150 | 10/1978 | Hori et al. | 423/242 |
| 4,245,569 | 1/1981 | Fallon | 110/215 |

OTHER PUBLICATIONS

Hydrocarbon Processing, Oct. 1981, pp. 115–124, "$NO_x$ Controls in Review", by A. A. Siddiqi and J. W. Tenini.

Primary Examiner—Gregory A. Heller
Attorney, Agent, or Firm—James R. Hoatson, Jr.; John F. Spears, Jr.; William H. Page, II

[57] ABSTRACT

A process is disclosed for treating particle-containing gas streams by removing particles and gaseous atmospheric pollutants. Parallel passage contactors are utilized to remove the gaseous pollutants. The minimum required gas flow rate for effective operation of these contactors is maintained by recycling a variable amount of low temperature gas which has been passed through a particle removal zone. The recycled gas is reheated by heat exchange against a portion of the treated gas.

18 Claims, 1 Drawing Figure

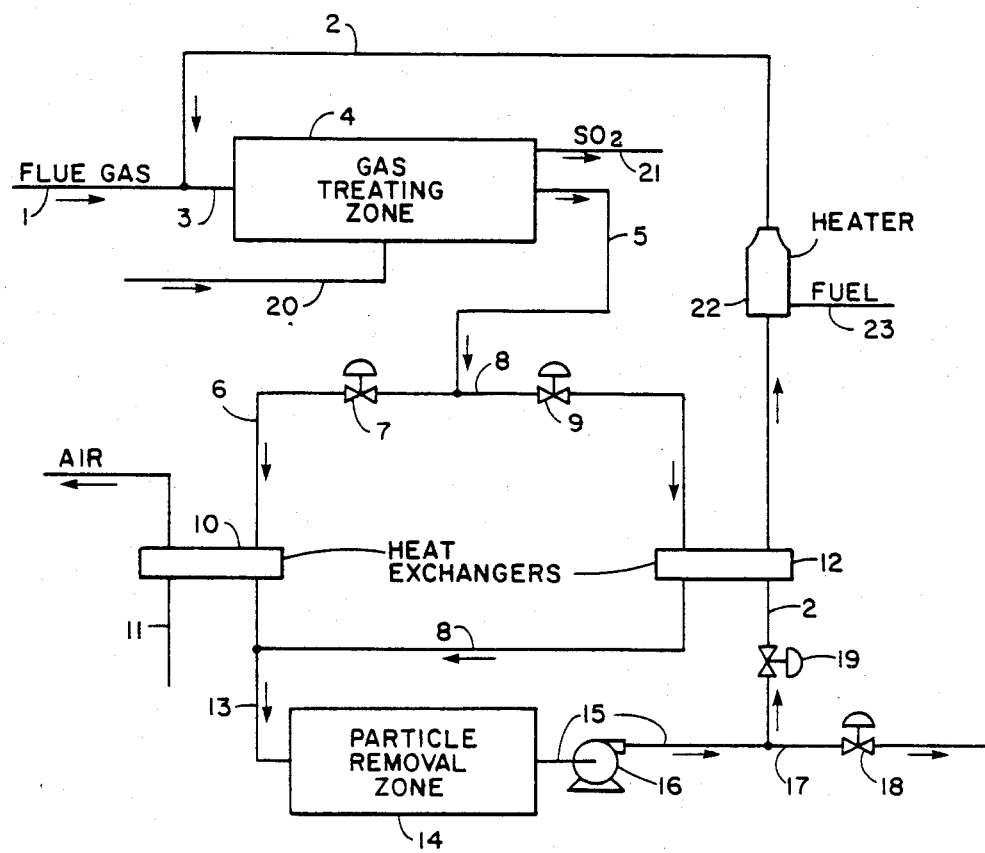

4,504,450

SULFUR OXIDES AND NITROGEN OXIDES GAS TREATING PROCESS

FIELD OF THE INVENTION

The invention relates to a gas treating process in which a gaseous atmospheric pollutant and fine particles are removed from a flue gas stream. The invention specifically relates to a gas treating process in which the flue gas stream is passed through parallel passage contactors in which the gas stream flows along a porous screen which retains a bed of gas treating particles rather than flowing through the bed. The process is preferably used to reduce sulfur dioxide and/or nitrogen oxide concentrations in flue gas streams which also contain flyash, fine catalyst particles or soot. The process is directly concerned with the manner in which the minimum desired total gas velocity is maintained within the parallel passage contactors in order to insure successful operation over a wide range of flue gas feed rates.

PRIOR ART

Gas treating processes to remove nitrogen oxides and sulfur oxides from flue gas streams have been widely described in the available literature. A survey article at page 115 of the October 1981 issue of *Hydrocarbon Processing* describes several flue gas treating processes. This article illustrates the overall flow of a flue gas treating process and also various parallel flow catalyst configurations including screened parallel passage contactors. Parallel passage contactors are also shown in U.S. Pat. No. 3,501,897 issued to H. J. A. Van Helden et al, which describes operating conditions and methods for the removal of sulfur dioxide from particle-containing gas streams. This reference also describes the minimum desired gas velocity through parallel passage contactors of the preferred type.

When the source of the gas stream being treated operates at a reduced rate, the volume of gas to be treated is accordingly reduced. This in turn reduces the gas velocity through the gas treating zone, and may lead to unacceptably low gas velocities unless corrective action is taken. It is believed that heretofore gas treating processes using parallel passage contactors employed a fan or compressor located upstream of the gas treating apparatus itself, e.g. the parallel passage contactor, and the air preheater to maintain the desired minimum gas flow rate. That is, the fan or compressor drove the still often hot particle-laden gas through the parallel passage contactor. Gas required to supplement the untreated gas was recycled from a location immediately downstream of the parallel passage contactor and upstream of the air preheater. An alternative design employed an induced draft fan to pull the hot gas through the contactor in the same flow path.

U.S. Pat. No. 3,989,798 issued to D. F. Greene et al is pertinent for its general teaching as to the use of parallel passage gas contactors for flue gas treating and for its teaching that the electrostatic precipitator or other particle-removing means may be located either upstream or downstream of the gas treating apparatus in the overall process flow.

U.S. Pat. No. 4,245,569 issued to G. W. Fallon, III, is pertinent for its showing of the use of induced draft fans located both upstream and downstream of the gas treating apparatus.

BRIEF SUMMARY OF THE INVENTION

The invention provides an improved process for treating flue gas streams with parallel passage contactors. The improved process has the advantages of lowering utilities cost and reducing maintenance. The improvements result in part from the placement of the fan used to effect any gas recycling in a location at which the gas it compresses is comparatively cool and clean. A broad embodiment of the invention may be characterized as a gas treating process which comprises the steps of admixing a hereinafter characterized recycle gas stream into a particle-containing flue gas stream and passing the resultant admixture through a treating zone in which the concentration of a gaseous atmospheric pollutant is reduced to a level below that in the flue gas stream and thereby forming a treated gas stream; cooling a first portion of the treated gas stream in a first heat exchange means used to heat air which is fed to the source of the flue gas stream; cooling a second portion of the treated gas stream in a second heat exchange means used to heat the recycle gas stream; passing the first and the second portions of the treated gas stream through a particle removal zone and thereby forming a processed gas stream; and discharging a first portion of the processed gas stream from the process by means of emission into the atmosphere and recycling a second portion of the processed gas stream as the previously referred to recycle gas stream, which is reheated in the second heat exchange means and then admixed with the flue gas stream.

BRIEF DESCRIPTION OF THE DRAWING

Referring now to the drawing, a flue gas stream from a coal-fired public utility boiler, or other similar industrial gas stream, enters the process through line 1 at a reduced rate compared to its normal full rate of flow. A recycle gas stream from line 2 is admixed into the flue gas stream, and the admixture is passed into a gas treating zone 4 through line 3. The flow rate and temperature of stream 2 is controlled to insure optimum conditions for the combined stream entering the gas treating zone. The gases therein flow through a series of parallel passage contactors containing sulfur oxide acceptors and nitrogen oxide reduction catalysts. Sulfur dioxide is removed from the flue gas stream and nitrogen oxides are reduced to nitrogen through reaction with a gaseous reductant previously admixed with the flue gas stream. The sulfur oxides are released from the acceptors through the use of a regenerent gas supplied by line 20 and removed as a relatively concentrated sulfur oxide stream carried by line 21. The resultant treated gas stream exits the gas treating zone through line 5.

A larger first portion of the treated gas stream enters line 6 at a rate controlled by valve 7. This portion of the treated gas stream is cooled in a first heat exchanger 10 which functions as the air preheater of the flue gas generating combustion zone, thus heating the air flowing through line 11. A smaller second portion of the treated gas stream enters line 8 at a rate controlled by valve 9. This portion of the treated gas stream is cooled in a second heat exchanger 12, giving up its heat to the recycle stream flowing through line 2. The two portions of the treated gas stream are then recombined and passed into an electrostatic precipitator or similar apparatus used as a particle removal zone 14 through line 13. This produces an effluent gas stream carried by line 15 and which is slightly pressurized by the induced draft fan 16. A major portion of the effluent gas stream is discharged from the process through line 17 at a rate controlled by valve 18. The remaining portion of the effluent gas stream enters line 2 at a rate controlled by valve 19 as the recycle gas stream of the process. This stream is heated in the heat exchanger 12 and then, if required for optimum control of line 3 temperature, further heated in the combustion reheat zone 22 through the combustion of fuel from line 23.

This description of one embodiment of the subject process is not intended to preclude from the scope of the inventive concept those other specific embodiments set out herein or which result from the expected modifications of those embodiments.

DETAILED DESCRIPTION

Pollution reduction facilities used on commercial scale processes must often remove both a gaseous pollutant and an entrained particulate pollutant from a feed gas stream. This is the case for instance when it is desired to lessen the concentration of both flyash and sulfur dioxide in the flue gas stream of a utility company boiler. It may also be desired to lower the concentration of nitrogen oxides in a boiler flue gas stream. Another example is the removal of both sulfur oxides and very fine catalyst fragments from the regenerator flue gas stream of a fluidized catalytic cracking unit present in a petroleum refinery. The particles present in the feed gas stream will normally accumulate within and rather quickly start to clog any treating device in which the feed gas stream must pass through rather small openings. This is the situation which would result if it was attempted to pass the feed gas stream through a fixed bed of treating particles such as catalysts or sulfur dioxide acceptors. While the removal of the entrained particles is desired, this filtration effect quickly increases the pressure drop through the particle bed. Even a small increase in the pressure drop through a flue gas discharge system is normally undesired since it will usually lower the efficiency of the process or cause other operational problems and excessive operating costs.

A number of solutions to the problem of pressure drop buildup in beds of treating particles have been developed. For instance, cross-flow or panel-type contactors may be employed. However, it is preferred that a parallel passage contactor system is utilized in the subject gas treating process.

Parallel passage reactors have proven successful as contactors for treating flue gas streams containing small particles such as flyash. These contactors do not normally become fouled by the accumulation of the particles on their porous walls and may therefore be used continuously for long periods of time without requiring maintenance or cleaning. These contactors derive their name from the fact that the main flow of the gas being treated is parallel to the porous wall retaining the treating particles. That is, the gas stream flows along the wall rather than into it. A slow transfer of gas through the wall, as by diffusion, brings the gas to be treated into contact with the treating particles without filtering the gas stream. The gas stream therefore does not flow through the bed of treating particles.

The success of these contactors is due in part to the maintenance of a linear gas velocity along the wall (through the planar gas passage) which is just slightly above the transition range from laminar to turbulent flow. This creates turbulence which increases the rate of admixture of the gases on the two sides of the porous wall of the contactor, thereby bringing untreated gas into contact with the treating particles. However, significant changes in the operation of the flue gas source occur rather frequently due to such factors as a change in the fuel or changes in the "load" or operating rate required of the flue gas source. The result of these changes include temporary reductions in the gas velocity through the planar gas passages of the contactors and changes in the characteristics of the flyash. Lower gas velocities reduce the effectiveness of the parallel passage contactors and may seriously degrade the performance of the gas treating process. These velocity changes can also promote the accumulation of fine flyash or soot particles on the outer surface of the contactors. This hinders the diffusion of gas through the porous surface of contactors thereby reducing the overall reaction rates and reactor capacity.

To counteract the problems which result from operating the parallel passage contactors at a low linear gas velocity, and for other reasons, a "hot gas booster fan" has been employed. The function of this fan is to force gas through the parallel passage contactor at a rate above that required to maintain the minimum acceptable gas velocity. The additional gas required for this circulation rate is obtained by recycling a portion of the treated gas stream. The use of a hot gas booster fan has a number of problems associated with it. These problems are basically related to the severe operating conditions of temperature and dust loading which occur at this location. The temperatures may range from about 300° to about 475° C. The gases would contain all of the corrosive sulfur dioxide and would also contain all of the entrained solids originally present in the flue gas stream. These solids can have a highly erosive effect on the fan itself. The hot gas booster fan also consumes a significant amount of electrical energy thereby increasing the utilities cost of operating the pollution reduction facility.

The flue gas being treated for the removal of gaseous pollutants is both hot and loaded with entrained particles since it is preferred that the gas treating zone is located upstream of both the air preheater and the particulate removal zone. This location upstream of the air preheater provides the high temperatures desired for operation of the flue gas treating zone. Also, the removal of the gaseous pollutants, especially sulfur dioxide, at this point lessens the possibility of the condensation of corrosive liquids such as sulfuric acid on the downstream equipment. This is especially important in the case of the air preheater, which is substantially cooler than the flue gas stream. The upstream location of the gas treating zone also facilitates the use of a "cold" electrostatic precipitator. That is, the precipitator may be designed for and operated at the relatively lower temperature downstream of the air preheater, which offers definite cost savings.

It is an objective of the subject invention to provide an improved parallel passage contactor gas treating process. It is a further objective of the invention to reduce the utilities cost of operating a parallel passage gas treating process. A further objective of the subject invention is to eliminate the need for a hot gas booster fan.

In the subject process the fan or compressor which maintains the desired gas flow through the parallel passage contactor is located downstream of the air preheater and the particle removal zone. The fan therefore acts on gas which has been cooled in the preheater and which has a much lower entrained particle concentration than the original flue gas. The subject process can also be applied with beneficial results to the treatment of feed gas streams which do not require the removal of entrained particles, with no particle removal zone being present. This situation may arise for example when a gaseous fuel such as natural gas is combusted to generate the flue gas and the flue gas is therefore essentially free of entrained particles. In this instance the recycle gas is obtained from downstream of the air preheater.

A broad embodiment of the invention in which a particle removal zone is not employed may be characterized as a gas treating process which comprises the steps of admixing a hereinafter characterized recycle gas stream into a feed gas stream and passing the resultant admixture through a treating zone in which the concentration of a gaseous atmospheric pollutant is reduced to a level below that in the feed gas stream and thereby forming a treated gas stream; cooling a first portion of the treated gas stream in a first heat exchange means used to heat air fed to the source of the feed gas stream; cooling a second portion of the treated gas stream in a second heat exchange means used to heat said recycle gas stream; and discharging the first portion of the treated gas stream from the process and recycling the second portion of the treated gas stream as said recycle gas stream, which is heated and then admixed with the feed gas stream. In this embodiment the two portions of treated gas are not admixed as in the embodiment shown in the drawing.

Although a particle removal zone is not present in the above described embodiment of the subject process, it is preferred that the feed stream contains entrained particles which are removed in a particle removal zone. This zone may employ any commercially feasible technique for removing the entrained fine particles. The particle removal zone may therefore be cyclone-type separators or impingement-type separators including those in which a liquid is employed. Various liquid scrubbing or droplet formation processes may also be employed if desired. It is preferred that an electrostatic precipitator is employed as the primary means of removing entrained particles from the treated gas stream.

The quantity of treated gas which is recycled will vary and is dependent on the flow rate of the feed gas stream. If the flow rate of the feed gas stream is equal to or near the design rate of the parallel passage contactor gas treating zone, then no treated gas will be recycled. However as the quantity of the feed gas stream decreases, the flow of recycle gas is first initiated and then increased to maintain a relatively constant gas flow rate through the gas treating zone. Therefore if the flow rate of the feed gas stream falls to about one-half of its normal or design rate, an approximately equal amount of recycle gas is admixed into the feed gas stream. The gas flowing through the gas treating zone is then approximately one-half recycle gas. The flow rate of the recycle gas stream is preferably controlled through the use of flow control valves located in the recycle gas line and in the discharge line. However, the flow control valve in the discharge line may not be required depending on the relative pressures downstream of the induced draft fan 16 and upstream of the gas treating zone. If the pressure differential between these two points is sufficient, it may not be necessary to constrict the discharge line to achieve the desired recycle gas flow rate unless the recycle flow is very sizable compared to the feed gas flow rate. The operation of the valves is preferably automatically controlled by a digital control device which receives a signal(s) representative of the gas flow rate through the gas treating zone. This device may also receive signals corresponding to the flow rate of the feed and/or recycle gas streams.

The temperature of the recycle gas stream should be high enough that its admixture into the feed gas stream does not result in the temperature of the feed gas stream being reduced below the desired operating temperature of the gas treating zone. If the flow rate of the recycle stream is very small, the temperature of the recycle gas stream may not be important as the much larger quantity of relatively hot feed gas would result in an admixture having a sufficiently high temperature. However, any significant flow of the recycle gas stream may require the heating of the recycle gas stream. This heating comprises heat exchange of the recycle gas stream against a portion of the effluent of the gas treating zone. The heat exchange is performed by indirect heat exchange of the two streams, with the heat being carried by or conducted through a solid. Tube and shell heat exchangers could therefore be employed, if desired, but the use of a Ljungstrom-type heater or similar rotating heat transfer device is preferred. The operational rate of rotary heat exchangers is preferably controlled on the basis of the flow rate of the recycle gas stream or the flow rate of the portion of the treated gas stream used to heat the recycle gas stream.

The heat source for the initial heating of the recycle gas stream is a diverted portion of the effluent of the gas treating zone. The flow rate of this heat source stream is preferably controlled by a flow control valve means which restricts the passage of the remaining portion of the treated gas stream through the conduit leading to the air preheater. A second flow control valve is preferably also used to restrict the flow rate of the heat source stream in a manner similar to that shown in the drawing. The operation of these two flow control valves is preferably controlled by the same device which controls the rate of flow of the recycle gas stream. Since the indirect heat exchange cannot heat the recycle gas stream to the temperature of the treated gas stream, it may be necessary to supply additional heat to the recycle gas stream. This is preferably done by the direct combustion of a fluid hydrocarbonaceous fuel in the recycle gas stream with the possible addition of any required combustion air. The use of this mode of heating is minimized to lower fuel costs, and is employed only if sufficient heat cannot be supplied by heat exchange. Although additional heat could be transferred to the recycle gas stream by merely increasing the flow rate of the portion of the treated gas used to heat the recycle gas stream, this practice is not preferred since it causes a corresponding reduction in the amount of heat available for transfer within the air preheater. It is therefore preferred that the flow rate of the diverted portion of the treated gas stream is approximately equal to the flow rate of the recycle gas stream. The flow rate of the treated gas passing through the air preheater is then approximately equal to the flow rate of the treated or processed gas which is discharged from the process.

The construction of parallel passage contactors is well described in the available references. It is preferred that the subject process is performed using parallel passage contactors which have planar reactant passages similar to those shown in FIG. 1 of U.S. Pat. No. 3,501,897 and in U.S. Pat. No. 3,747,308. These gas passages are flat volumes located between the opposing walls of two adjacent acceptor packages or cells. Each gas passage has a width, measured perpendicular to the porous walls, of from about 3 to about 50 mm and preferably from about 5 to 10 mm (0.20 to 0.39 inch). This relatively small distance is uniform throughout an individual gas passage, which is preferably located between porous walls which measure about one meter square. This area size allows rapid and convenient mass fabrication of the contactors, with the gas stream being directed through several passages in series to achieve any desired total reactor capacity.

The parallel passage contactors preferably comprise a plurality of adjacent catalyst packages separated from each other by the planar gas passages. Each catalyst package preferably has two parallel porous walls, with each wall thereby forming one side of a different gas passage. The distance between the porous walls of an individual catalyst package is from about 1 to 25 mm, which results in a relatively thin catalyst bed having a shape similar to that of the gas passages. Alignment of the catalyst packages in a parallel relationship separated by the gas passages, located between walls of each pair of adjacent contactors, results in a contactor structure which comprises alternating passages and catalyst packages. Preferably each of these structures contains about 20 to 50 passages and catalyst packages to result in a box-like structure having outer dimensions which are approximately equal, on all three sides, to the length of the square porous walls of the individual catalyst packages. Similar structures are shown in the previously cited references, and further details may be obtained from these references. The gas stream being treated will normally pass through several of these structures in series.

The porous walls of the catalyst packages are preferably formed by woven wire mesh, with other wall constructions and other materials being usable if they may withstand the chemical, thermal and mechanical stresses present in the contacting zone and provide adequate porosity. The openings in the porous walls should be the maximum size which still ensures retention of the catalyst or acceptor particles. The openings may, for example, be between about 0.07 and about 0.85 mm across. Preferably, the openings are in the range of from about 0.074 to 0.250 mm. The solid treating particles (catalyst and/or acceptors) preferably fill the entire volume of each catalyst package in a dense non-moving bed which hinders vibration or other agitation which could induce catalyst fracture or wear. This treating particle bed has a width equal to the distance between the porous walls of the respective catalyst package. This distance is preferably between 3 and 10 mm.

The conditions employed in operating the subject process preferably include a linear gas velocity through the passages of the contactor which is just above the threshold into turbulent flow conditions. High velocities result in increased turbulence but also lead to undesired higher pressure drops. This is the velocity of the reactant through the gas passage in a direction parallel to the surface of the porous wall and in no way refers to the rate of gaseous diffusion or passage through the porous wall. Linear gas velocities of from about 2 to about 20 meters/second may be employed, with linear gas velocities above 10 meters/second being preferred. A low pressure drop through the process is normally desired since any pressure drop adversely affects the performance of utility boilers and power plants, etc. which are expected to be the major source of the flue gas being treated. The pressure drop through an entire contacting zone, which normally contains several parallel passage contactors arranged for series flow, should be less than 20 inches of water and preferably is less than 12 inches of water and most preferably is between about 1 and 4 inches of water. Although low pressure drops are desired, the gas flow rate should be sufficient to at least minimize the settling out of particles entrained in the gas stream or the deposition of these particles on the outer surface of the porous walls of the catalyst packages.

The operating pressure of the process will be set by the pressure of the gas stream being treated. As the preferred feed gas stream is a flue gas stream from a combustion zone, the operating pressure will normally be quite low, usually less than 50 psig. A preferred operating pressure range is from about 10 to about 20 psia. The operating temperature of the process will be set by the temperature required for successful utilization of the catalyst or acceptors present in the contactors and by the effect of the operating temperature on the economics of the process which produces the gas stream being treated. For the acceptance of sulfur dioxide from a flue gas stream through the use of copper-containing acceptor particles, a temperature from about 300° to about 475° C. is normally employed. A preferred range of acceptance temperatures is from 325° to 425° C. Other acceptors or catalyst will have different optimum operating temperatures, and the subject process can be operated at virtually any temperature to adapt to the usage of these differing treating particles.

The treating particles employed in the process may function as acceptors and/or as catalysts. For instance, the preferred copper-containing treating particles function as acceptors when they remove sulfur oxide from the gas stream. This results in copper present in the treating particles being converted to copper sulfate, which is an excellent catalyst for promoting the reduction of nitrogen oxides to nitrogen. This reaction occurs in the presence of a reductant which is mixed into the gas stream at a point upstream of the contactors. A preferred reductant is ammonia. The subject process can be employed when the treating particles of the solids-filled packages are utilized solely as catalysts. An example of this is the use of the parallel passage contactors to only reduce nitrogen oxides, as might be performed when another process is being utilized to remove sulfur oxides or when the flue gas stream is being produced by a low sulfur fuel which renders flue gas desulfurization unnecessary. This reduction may be performed at the previously described conditions of temperature and pressure.

The preferred treating particles for sulfur dioxide removal comprise copper on a refractory inorganic support. This support may be chosen from various materials including clays, bauxite, silica, alumina and silica-alumina mixtures. The preferred support is gamma-alumina. The support preferably has a large surface, above 100 m$^2$/g, and a pore volume of 0.30–0.60 ml/g. Surface areas of 160–230 m$^2$/g are highly suitable. The finished acceptor may contain from about 1 to 25 wt. % copper, with from 5 to 15 wt. % copper being preferred. The acceptors can be made by normal methods such as impregnation of the carrier in an aqueous solution of a copper salt followed by drying and calcination. Other acceptors may be employed such as those containing an alkali metal promoted with a vanadium compound or those disclosed in U.S. Pat. Nos. 4,170,627;

4,105,745 and 3,987,146. The copper on alumina acceptors are preferred for sulfur dioxide removal since they allow regeneration at the same operating conditions, which eases implementation of the regeneration procedure and promotes long useful acceptor lifes. Regeneration may be performed by terminating the acceptance mode and passing a reducing gas such as hydrogen, $C_1$–$C_3$ hydrocarbons or carbon monoxide through the gas passages. This results in the release of sulfur dioxide, which may then be recovered as described in U.S. Pat. No. 4,041,131. The acceptors are then contacted with an oxygen-containing gas to return any elemental copper or copper sulfide to copper oxide, which is the active sulfur dioxide removing form of the metal. Flue gases usually are effective gases for use in this oxidizing step. Further details on acceptor-catalyst manufacture, process operation and acceptor regeneration are available from many sources including the previously cited references.

If the subject process is utilized only for the reduction of nitrogen oxides, then it is preferred that a reduction catalyst comprising vanadium as an active catalytic component and a titanium oxide support is employed as the treating particles. Preferably the catalyst contains less than 15 wt. % vanadium oxide and also contains tungsten oxide in an amount less than 5 wt. %. These treating particle catalysts may also contain molybdenum, iron, nickel, cobalt and chromium. Further details on the preparation and usage of suitable nitrogen oxide reduction catalysts of this type may be obtained by reference to U.S. Pat. No. 4,085,193.

The invention may therefore be characterized as a gas treating process which comprises the steps of admixing a hereinafter characterized recycle gas stream into a particle-containing flue gas stream and passing the resultant gas admixture into a treating zone operated at treating conditions including an elevated temperature and in which the gas admixture is passed through parallel passage contactors containing gas treating particles and thereby forming a treated gas stream; cooling a first portion of the treated gas stream by heat exchange against an air stream; cooling a second portion of the treated gas stream by heat exchange against the recycle stream; removing entrained particles from the combined first and second portions of the treated gas stream in a single particle removal zone and thereby forming a processed gas stream; and dividing the processed gas stream into a first portion which is withdrawn from the process and a second portion which is recycled as the recycle stream.

I claim as my invention:

1. A gas treating process for reducing the concentration of sulfur oxides and nitrogen oxides which comprises the steps of:
   (a) admixing a hereinafter characterized recycle gas stream into a feed gas stream containing sulfur oxides and nitrogen oxides and passing the resultant admixture through a treating zone in which the concentration of the sulfur oxides and nitrogen oxides is reduced to a level below that in the feed gas stream to form a treated gas stream;
   (b) cooling a first portion of the treated gas stream in a first heat exchange means used to heat air fed to the source of the feed gas stream;
   (c) cooling a second portion of the treated gas stream in a second heat exchange means used to heat said recycle gas stream; and,
   (d) discharging the first portion of the treated gas stream from the process and recycling the second portion of the treated gas stream as said recycle gas stream, which is heated and then admixed with the feed gas stream.

2. The process of claim 1 further characterized in that nitrogen oxides are catalytically reduced to nitrogen within the treating zone.

3. The process of claim 1 further characterized in that the recycle stream is further heated by combustion after being heated by heat exchange against the second portion of the treated gas stream.

4. A gas treating process for reducing the concentration of sulfur oxides and nitrogen oxides which comprises the steps of:
   (a) admixing a hereinafter characterized recycle gas stream into a particle-containing feed gas stream containing sulfur oxides and nitrogen oxides and passing the resultant admixture through a treating zone in which the concentration of the sulfur oxides and nitrogen oxides is reduced to a level below that in the feed gas stream to form a treated gas stream;
   (b) cooling a first portion of the treated gas stream in a first heat exchange means used to heat air fed to the source of the feed gas stream;
   (c) cooling a second portion of the treated gas stream in a second heat exchange means used to heat said recycle gas stream;
   (d) passing the first and the second portions of the treated gas stream through a particle removal zone to form a processed gas stream; and
   (e) discharging a first portion of the processed gas stream from the process and recycling a second portion of the processed gas stream as said recycle gas stream, which is heated and then admixed with the feed gas stream.

5. The process of claim 4 further characterized in that nitrogen oxides are catalytically reduced to nitrogen within the treating zone.

6. The process of claim 4 further characterized in that the recycle stream is further heated by combustion after being heated by heat exchange against the second portion of the treated gas stream.

7. The process of claim 4 further characterized in that the treating zone comprises parallel passage contactors.

8. The process of claim 7 further characterized in that the parallel passage contactors contain acceptor particles which comprises copper.

9. The process of claim 5 further characterized in that the treating zone comprises parallel passage contactors.

10. The process of claim 9 further characterized in that the parallel passage contactors contain catalyst particles which comprise copper.

11. The process of claim 9 further characterized in that the parallel passage contactors contain catalyst particles which comprise either vanadium or tungsten or both.

12. A gas treating process for reducing the concentration of sulfur and nitrogen oxides which comprises the steps of:
   (a) admixing a hereinafter characterized recycle gas stream into a particle-containing flue gas stream containing sulfur oxides and nitrogen oxides and passing the resultant gas admixture into a treating zone operated at treating conditions including an elevated temperature and in which the gas admixture is passed through parallel passage contactors containing gas treating particles to form a treated gas stream having a reduced concentration of sulfur oxides and nitrogen oxides;

(b) cooling a first portion of the treated gas stream by heat exchange against an air stream;

(c) cooling a second portion of the treated gas stream by heat exchange against said recycle stream;

(d) removing entrained particles from the first and the second portions of the treated gas stream in a particle removal zone to form a processed gas stream; and (e) dividing the processed gas stream into a first portion which is withdrawn from the process and a second portion which is recycled as said recycle stream.

13. The process of claim 12 further characterized in that the flow rate of the recycle gas stream is varied as required to maintain a predetermined minimum total gas flow through the treating zone.

14. The process of claim 13 further characterized in that the flow rate of the second portion of the treated gas stream is varied as required to compensate for changes in the flow rate of the recycle stream.

15. The process of claim 12 further characterized in that a gaseous reductant is added to reduce the nitrogen oxides and is consumed in the reduction of nitrogen oxides is also passed into the treating zone.

16. The process of claim 15 further characterized in that the gas treating particles comprise vanadium.

17. The process of claim 15 further characterized in that the gas treating particles comprise tungsten.

18. The process of claim 15 further characterized in that the gas treating particles comprise copper.

* * * * *

UNITED STATES PATENT AND TRADEMARK OFFICE
CERTIFICATE OF CORRECTION

PATENT NO. : 4,504,450
DATED : March 12, 1985
INVENTOR(S) : James T. Forbes

It is certified that error appears in the above-identified patent and that said Letters Patent are hereby corrected as shown below:

On the title page;

On the face of the patent, change the filing date from "December 20, 1983" to --December 20, 1982--.

Signed and Sealed this

Ninth Day of July 1985

[SEAL]

Attest:

DONALD J. QUIGG

Attesting Officer     Acting Commissioner of Patents and Trademarks